United States Patent
Jahn et al.

[15] 3,667,326
[45] June 6, 1972

[54] DEVICE FOR TESTING THE IMBALANCE OF BALANCE WHEELS

[72] Inventors: Paul Jahn, Schramberg; Alfred Kapp, Schramberg-Sulgen, both of Germany

[73] Assignee: Gebruder Junghans G.m.b.H., Schramberg, Wurttemberg, Germany

[22] Filed: Nov. 16, 1967

[21] Appl. No.: 683,724

[30] Foreign Application Priority Data

Nov. 16, 1966 Germany....................J 32260

[52] U.S. Cl. ..............................................408/16, 193/12
[51] Int. Cl. ..................................B23b 41/00, B23b 49/00
[58] Field of Search ....................................77/5; 193/12, 13

[56] References Cited

UNITED STATES PATENTS

| | | |
|---|---|---|
| 1,180,473 | 4/1916 | Cobb.........................................193/12 |
| 2,288,690 | 7/1942 | Eddison et al. ...........................77/5 X |
| 2,587,048 | 2/1952 | Kohlhagen..................................77/5 |
| 2,932,191 | 4/1960 | Jahn............................................77/5 |

*Primary Examiner*—Francis S. Husar
*Attorney*—Watson, Cole, Grindle & Watson

[57] ABSTRACT

A device for testing, finding and eliminating any imbalance of a rotary body such as a balance wheel of watches and clocks having various elements to measure imbalance and equilibrate the body to its desired correct balance. The device includes measuring means, correction tools, drilling means, brake structure and means to transport the bodies through the various corrective and measuring stages.

1 Claim, 17 Drawing Figures

DEVICE FOR TESTING THE IMBALANCE OF BALANCE WHEELS

This invention relates to a device for the finding and eliminating of the imbalance of a disk-shaped rotating body with a small gyrating mass, preferably of a balance wheel, with a measuring device in which the body that is to be equilibrated is placed in rotation and a changing mechanical value occurring during the rotation. As a result of the imbalance, it is converted into an electrical value whose amplitude serves as a measure for the value of the imbalance that is to be corrected and its phase relation for the determination of the place at which the correction, correcting the imbalance, is to be made. A tool is provided for the elimination of the imbalance, for example, a drilling device, and a braking device is provided which is triggered by said electrical value, released after the measuring value has been obtained for the value of the imbalance at the time of a certain phase relation of the electrical value produced, and which promptly arrests the body that is to be equilibrated and which rotates at the test speed in a suitable position in front of the tool in order to eliminate the imbalance.

A device of this type is known and in the case of this device, it is necessary to place the body, that is to be equilibrated, by hand into the measuring device and remove it again from said device after the operation.

The present invention is based on the feature to develop the known device in such a manner that it will operate to a large extent automatically. At the same time, while being of a simple structure, the device is to operate reliably and is supposed to take into account all sorts of possibilities, so that it can be used for individual measurements and for equilibration of individual bodies, in addition to be used in mass production. This will be achieved, according to the invention, by providing a transportation arrangement moving the bodies, which are to be equilibrated, into the measuring device, in that the measuring arrangement contains a holding arrangement for the bodies that are to be equilibrated, in that a take-over device has been provided carrying away the bodies that are to be equilibrated from the measuring device and in that a control arrangement has been provided influencing the transporting device and/or the holding device, and being influenced by the measuring device.

At the same time, a storage place, receiving several bodies that are to be equilibrated can be assigned to the transportation arrangement, which preferably is exchangeable. The holding device comprises preferably two radially closed bearings, receiving the axis of the body that is to be equilibrated, which are arranged on two arms mounted swivelably, in the plane of the axis. A friction wheel, which is connected with a drive, can be assigned to the measuring device holding the body that is to be equilibrated, which friction wheel can be brought into frictional contact with the body that is to be equilibrated.

The control arrangement comprises preferably a trailing or servo-control device for rising and falling DC electric current, which will both limit the work path of the tool and releases the stop of the body that is to be equilibrated. A cam disk can be provided for limiting of the work path of the tool with which the servo-control device is only connected positively in the adjusting direction, whereby a holding device, operable by the control arrangement, is assigned to the cam disk. Preferably, the servo-control device and the cam disk are connected with one another by means of a spring.

For the release of the brake device for the bodies that are to be equilibrated, a switching device operable by the servo-control arrangement can be provided. Preferably, this switching device comprises a contact arranged on a swivelably mounted arm, to which is assigned a stationary contact, whereby a cam disk driven by the servo-control has been provided, which cam disk keeps the contacts separated from one another in the rest position of the servo-control device, and whereby an arm has been provided which is in frictional contact with the cam disk and which has been connected with the swiveling arm, and which seeks to bring about a closing of the contacts in the case of the adjustment movement of the servo-control device. Preferably in this case, the cam disk is provided with a cam which is adjustable in the peripheral direction.

Furthermore, the control arrangement preferably contains a cam shaft driven by a transportation motor, for the drive of control linkages for the operation of the holding device, the take-over device and the driving arrangement for the test body.

Further objects will be apparent from the following description when considered in connection with the accompanying drawings in which.

Figures 1, 2:
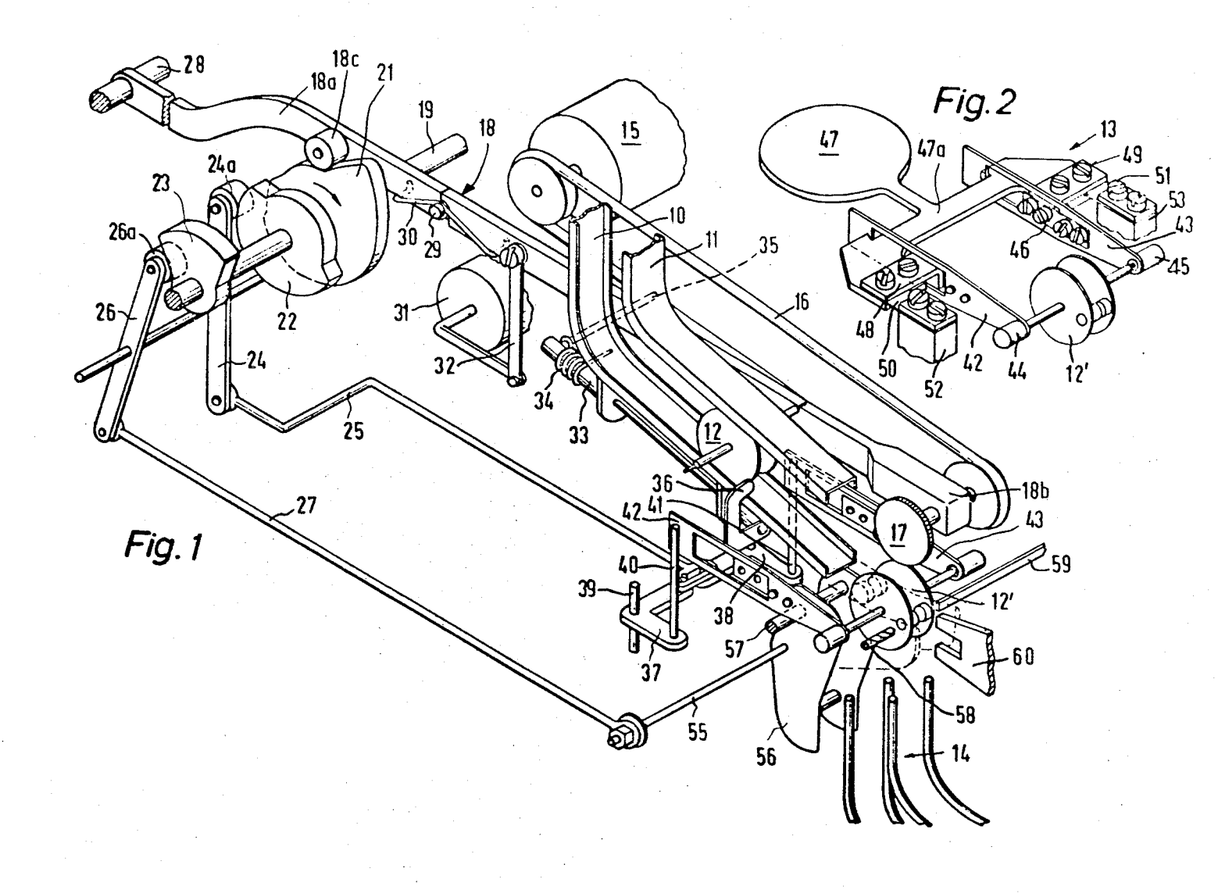
FIG. 1 is a perspective view of an apparatus for balancing the balance body according to the invention.
FIG. 2 is a perspective view of the measuring device with its holding arrangement.

The reference numbers 10 and 11 designate two guide rails in FIG. 1, which serve for the feed in of balance wheel bodies to the measuring device. In FIG. 1, the rails 10 and 11 have a balance wheel body 12 therebetween, which is held in the rails 10 and 11 by the lock 36, which will be explained. After release of the lock 36, the balance wheel body reaches the measuring device designated in FIG. 2 in a general manner by 13, in which measuring device the balance wheel shaft is received by the bearings 44 and 45.

Figures 8, 9, 10:
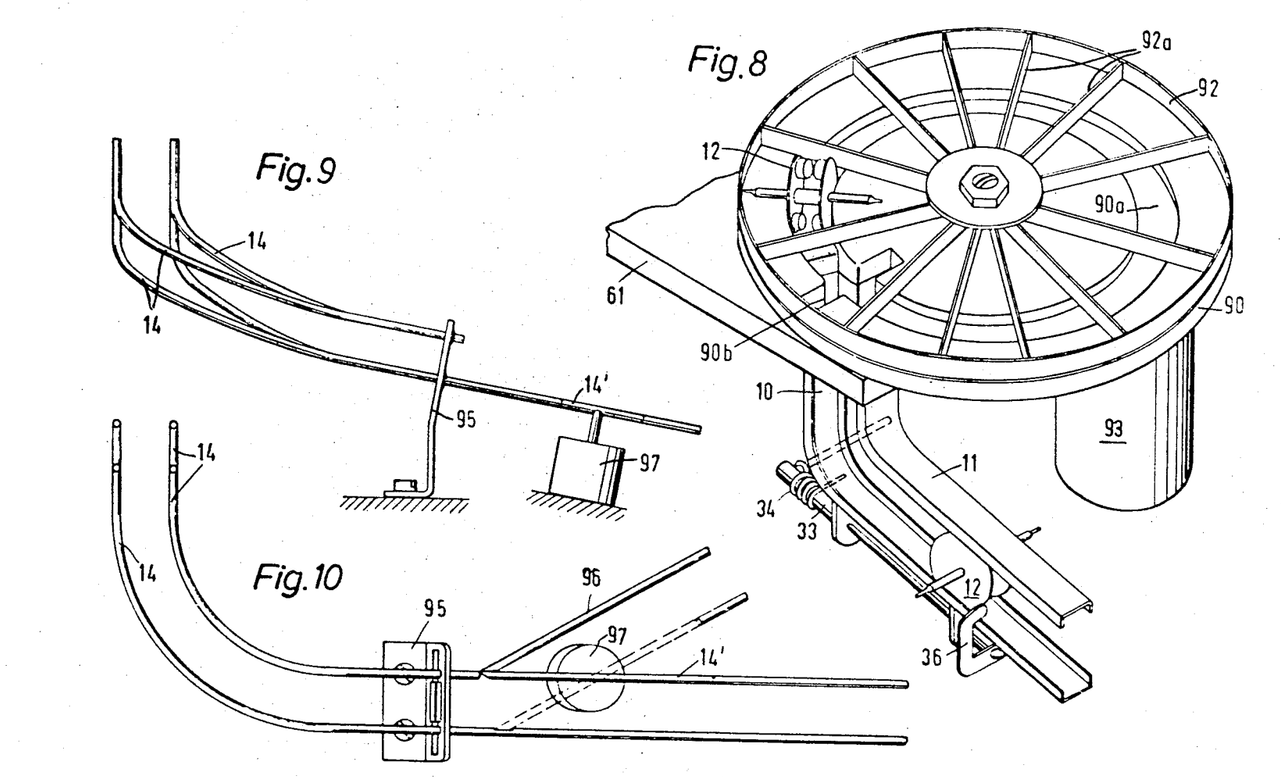
FIG. 8 is a perspective view of a modified magazine.
FIG. 9 is a side view of the take-off device.
FIG. 10 is a plan view of the device of FIG. 9.

After carrying out the equilibrating process, the balance wheel 12' is released and drops into the take off arrangement designated by 14, which has been shown in more detail in FIGS. 9 and 10.

A motor 15 has been provided for the drive of the balance wheel 12', which drives a friction wheel 17 by a belt 16, which friction wheel is mounted in a lever 18. This lever 18 is mounted swivelably on an axle and it can be moved up and down with the aid of a cam shaft 19, as a result of which the friction wheel 17 can be brought into frictional contact with the balance wheel 12' and can be moved away from the latter.

The measuring device has been designated in FIG. 2 in a general manner by 13. It contains two arms 42 and 43 which carry at one end the two bearings 44 and 45. The arms 42 and 43 have been attached to two carriers 52 and 53 with the aid of pliable lamellae 50 and 51. Furthermore, a counterpoise 47 has been attached to the arms 42 and 43, which has been connected by way of a cross arm 47a and by likewise pliable lamellae with the arms 42 and 43. One of these pliable lamellae has been designated in FIG. 2 with the reference number 46. By means of the connection of the measuring device 13 with the carriers 52 and 53 with the aid of pliable lamellae, this measuring device is swivelable around an axis which is in parallel to the balance wheel shaft. Beside that, each of the two arms 42 and 43 can be swiveled around a perpendicular axis, as a result of which the bearings 44 and 45 can be moved in a horizontal plane receiving the balance wheel shaft.

The movement of the arms 42 and 43 is brought about with the aid of pegs 40 and 41, which have been arranged on two toggle levers 37 and 38, which are swivelable around one perpendicular axle 39 each. The free ends of the levers 37 and 38 are connected with the swiveiably mounted lever 24 by a rod 25, which lever at its free end carries a roller 24a cooperating with a cam 22.

In order that the arms 42 and 43 with their bearings 44 and 45 can seize a balance wheel 12' moved out of the guide rails 10 and 11, a gripping device 56 has been arranged at the end of the guide rails 10 and 11, which is swivelable around an axis 57. The swiveling movement takes place by means of a rod 55, which in turn is connected with a swivelably mounted lever 26 by a rod 27, which lever at its free end carries a roller 26a cooperating with the cam 23. The gripping device 56 can be swiveled with the aid of the cam 23 into the position shown in a broken line in FIG. 1, in which position this device holds the balance wheel 12' in a position in which it can be seized by the bearings 44 and 45.

The lever 18 consists of the two parts 18a and 18b, which can be swiveled head on around the peg 29. The two lever parts 18a and 18b are held by the spring 30 in the position shown in FIG. 1.

For the purpose of swiveling the lever part 18b around the peg 29, a rotary magnet 31 has been provided which is connected by a tie rod 32 with the lever part 18b. In this manner it is possible to place the friction wheel 17 in frictional connection with the balance wheel 12', independently of the position of the cam 21.

Figures 5, 6, 7:
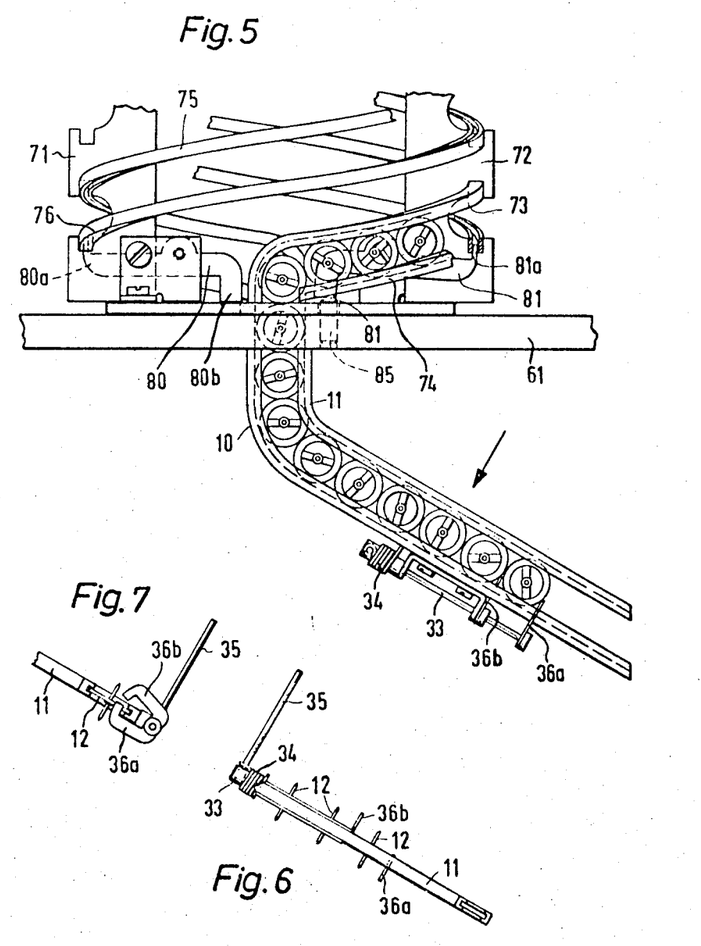
FIG. 5 is a side view of a part of the magazine according to FIG. 3.
FIG. 6 is a plan view of a detail as viewed in the direction of the arrow of FIG. 5.
FIG. 7 is a plan view of the feed lock according to FIG. 6.

The lock 36, which holds the balance wheel body located between the guide rails 10 and 11, consists, as can be seen in FIGS. 5 to 7, of two angular arms 36a and 36b which have been fixedly arranged on the shaft 33. This shaft, at its free ends, carries a rod 35 which rests upon the lever part 18b carrying the friction wheel 17. By the spiral spring 34, the rod 35 is pressed against the lever part 18b. In case this lever part 18b is lifted, then the rod 35 is swiveled upwards and thus the arms 36a and 36b, as shown in FIG. 7, are swiveled to the left. In the case of swiveling these arms 36a and 36b, the balance wheel, held in the lock, will be released in the middle position of these arms and it rolls between the guide rails 10 and 11 in the direction of the measuring device 13.

Figure 11:
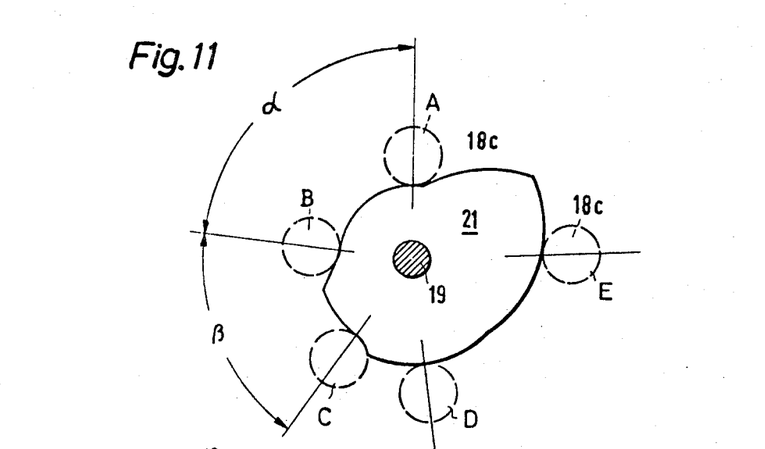
FIGS. 11 to 15 are side views partly in section showing the control cams.
Figure 12:
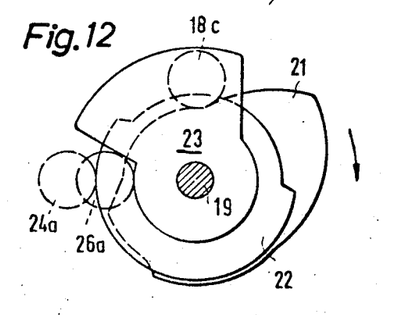
Figure 16:
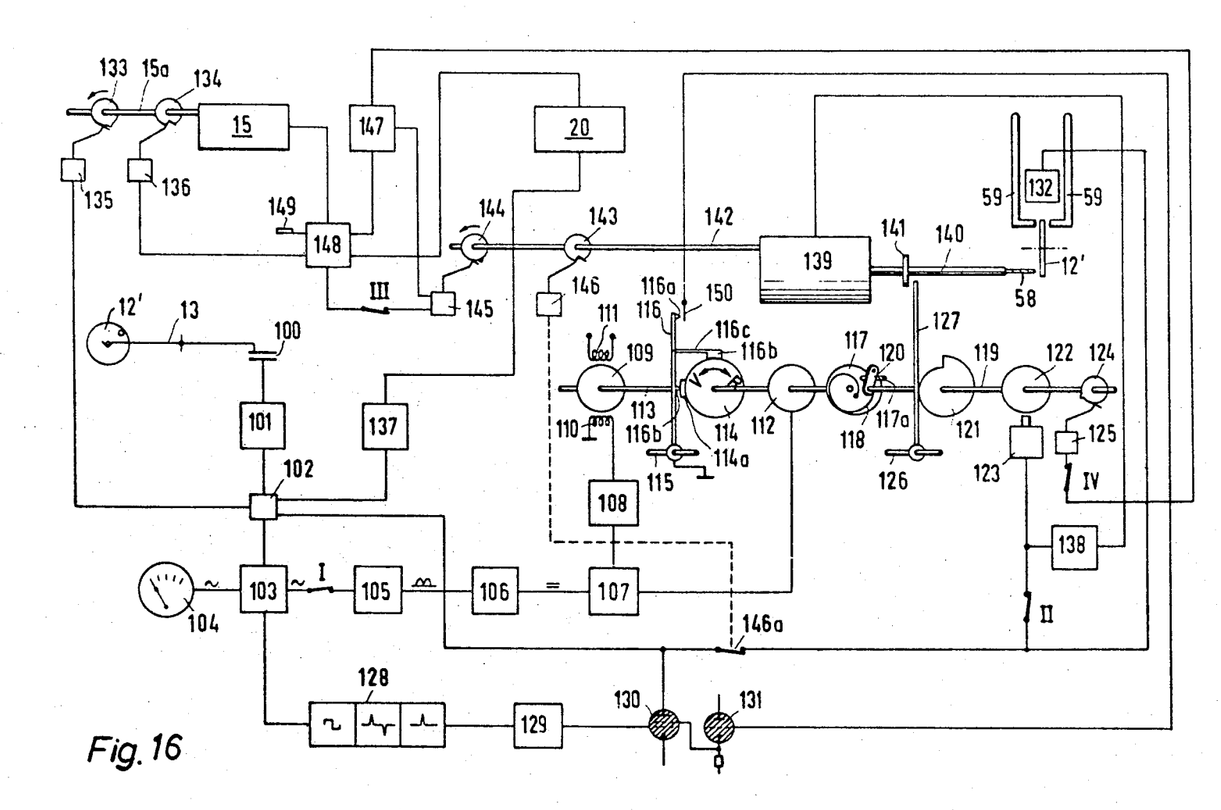
FIG. 16 is a diagrammatic view of the complete control elements and connections.

The shaft 19 which carries the cams 21 and 23 is driven by a transporting motor designed with the reference number 20 in FIG. 16. The operation of the various arrangements is brought about by the cam disks 21 and 23, arranged on the shaft 19, by the above mentioned rod systems. In FIGS. 11 to 15 the various operating processes, which are brought about by the cams, are shown in detail. The operating position shown in FIG. 1 corresponds to the cam position shown in FIG. 12. The shaft 19 is driven by the transporting motor 20 in the direction of the arrows shown in FIGS. 12 to 15, as a result of which the rollers 18c, 24a and 26a, assigned to the cams, are lifted up or lowered corresponding to the shape of the cams. The various positions of the rollers 18c with regard to the cam 21 are indicated in FIG. 11. In actual fact, the roller 18c naturally does not assume the positions A to E as shown, rather the cam 21 rotates in the direction of the arrow and the roller is either lifted or lowered corresponding to the presentations in FIGS. 12 to 15.

Starting out from position A in FIG. 11, the cam 21 moves in the direction of the arrow around the angle α. During this rotational angle, the friction wheel 17 is in contact with the balance wheel 12'. In the subsequent rotation around the angle β, the roller 18c and thus the lever part 18b is lifted up, as a result of which the friction wheel 17 is lifted off the balance wheel 12'. In the case of a further rotation of the cam 21, the roller 18c reaches the position E by the position D, in which former position the rod 35 of the locking device 33, 36 is also lifted up together with the lever part 18b far enough, so that the locking arms 36a and 36b in FIG. 7 will be swiveled to the left, as a result of which, in the middle position of the arms 36a and 36b, the foremost of the balance wheel bodies located between the guide rails 10 and 11 will be released. Then the next following balance wheel body is held firmly by the arm 36b. In the case of the subsequent downward movement of the lever part 18b, the arm 36a of the locking device again arrives between the guide rails 10 and 11, while the arm 36 b is again moved on, as a result of which the foremost balance wheel body again reaches the position shown in FIG. 1.

In the case of the rotation of the shaft 19, the rod 25 is operated by the cam disk 22 in such a manner that the arms 42 and 43 are moved at a suitable movement for the reception of a new balance wheel and for the release of an equilibrated balance wheel.

Through the cam disk 23, during this time, that is to say during the release of a new balance wheel, the catching device is swung into the position drawn in a broken line FIG. 1, as a result of which the balance wheel is caught within the area of the bearings 44 and 45.

In the case of normal operation, the shaft will revolve from position A into position C FIG. 11, in which the transporting engine or motor 20, driving the shaft 19, FIG. 16, is switched off by a contact driven by itself. The equilibration of the balance wheel is accomplished in this position.

If the imbalance has not yet been eliminated at the first working, or if a control measurement is to take place after this working, then it will be necessary to drive the balance wheel 12' once more. Since the cam 21 is at a standstill, the part 18b of the lever is swung around the peg 29 with the aid of the rotary magnet 31, so that the friction wheel 17 comes into frictional contact with the balance wheel 12'.

Figure 13:
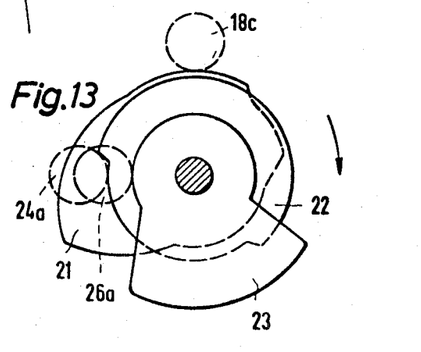
Figure 14:
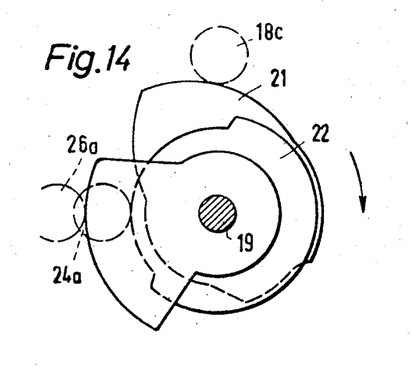
Figure 15:
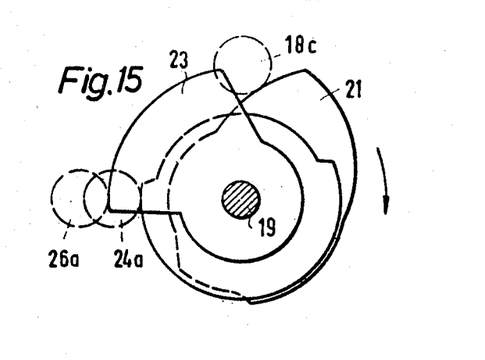

After elimination of the imbalance, the transport engine 20 is switched on again, as a result thereof the shaft 19 continues to turn until it reaches the position shown in FIG. 13, in which the roller 24a is lifted by the cam 22, as a result of which the ends of the arms 42 and 43 carrying the bearings 44 and 45 are moved apart and thus release the balance wheel. In the case of a further rotation of the shaft 19, the roller 26a will be lifted by the cam 23 and thus the catching device 56 is brought into the position drawn in a broken line in FIG. 1. In the case of a further rotation of the shaft 19, the latter assumes the position as shown in FIG. 14, in which, as described previously, the locking device 36 is released and thus a new balance wheel body is moved into the measuring arrangement 13. In the case of the position of the shaft 19 according to FIG. 15, the roller 24a has been lifted up by the cam 22, as a result of which the pegs 40 and 41 are moved outward. Thus, the arms 42 and 43 have been released, as a result of which the shaft of the newly fed-in balance wheel has been received by the bearings 44 and 45. The method of operation will be explained in more detail later on in connection with FIG. 16.

Figure 3:
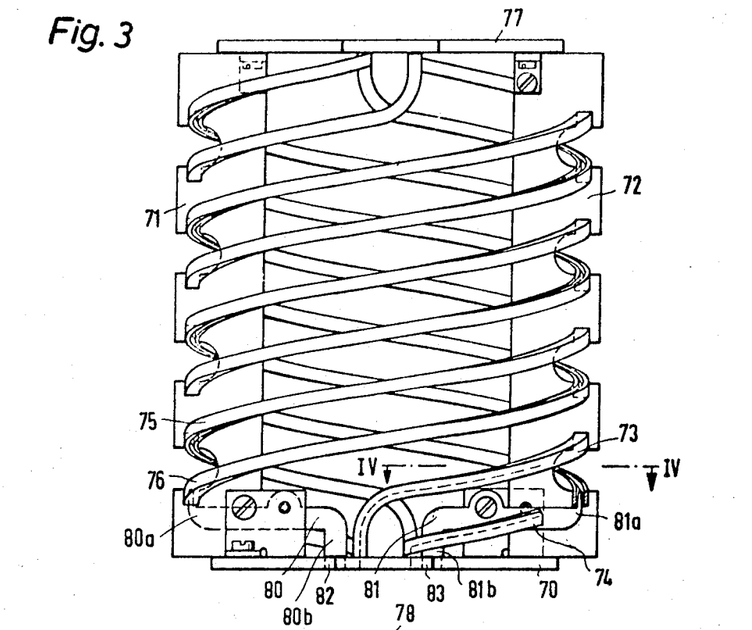
FIG. 3 is a side elevation of a magazine for the balance wheels to be measured.
Figure 4:
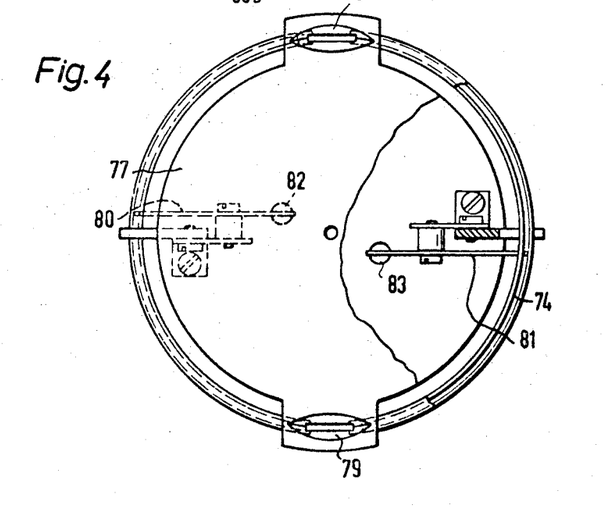
FIG. 4 is a top plan view of the magazine partly in section taken on line IV—IV of FIG. 3 in the direction of the arrows.

The balance wheel bodies 12 fed to the device by means of the guide rails 10 and 11 are preferably taken from a storage space, which, for example, is exchangeable. Such a storage space can be developed in different ways corresponding to the types of balance wheels that are to be received. In FIGS. 3 to 5 a storage space has been shown which is suited particularly for balance wheel bodies consisting of one disk, while a storage space has been shown in FIG. 8 which is provided preferably for double disk storage spaces for balance wheel bodies.

The storage space shown in FIGS. 3 to 5 consists of a base plate 70 on which two perpendicular carrier plates 71 and 72 have been arranged. In these carrier plates 71 and 72, recesses pointing in an outward direction have been provided, in which guide rails 73 and 76 are held. These guide rails are wound spiral fashion. Two guide rails each, namely the guide rails 73 and 74 as well as the guide rails 75 and 76 form a screw thread. The guide rails have been developed U-shaped and the guide rails forming a screw thread face each other with their open sides. The disks of the balance wheel bodies are held by these guide rails. The storage place has been closed on top by a plate 77, in which openings 78 and 79 have been provided through which the storage space can be filled with balance wheel bodies.

In the lower part of the storage space the levers 80 and 81 have been provided, which have been mounted swivelably and which carry at one end fingers 80a and 81a. These fingers 80a and 81a mesh through corresponding perforations in the guide rails 74 and 76 with said rails, so that the exit of the storage space is locked.

The two free ends 80b and 81b of the levers 80 and 81 rest upon the base plate 70, which contains perforations 82 and 83 within the reach of these lever ends 80b and 81b.

The storage box is placed on a corresponding plate 61 of the device according to the invention, FIG. 5. This carrier plate has a bolt 85 onto which the storage box is placed with one of its perforations 82 and 83. As a result thereof, the proper lever end 80b and 81b is lifted up, thereby pulling out the oppositely located lever end 80a or 81a from the corresponding guide rail, as a result of which the exit from the storage box is released or opened.

As can be seen particularly in FIG. 3, the storage box represents a double threaded screw. In the case of the storage space shown in FIG. 5, one of the screw threads is connected with the guide rails 10 and 11, while the other screw thread, formed by the guide rails 75 and 76, has been closed by the lever 80 or its end 80a. If the screw thread formed by the rails 73 and 74 is empty, then the storage box is lifted off the plate 61 and is rotated 180°, as a result of which the end of the screw threads 75 and 76 now establishes contact with the entrance of the guide rails 10 and 11 and the lever end 80b is lifted by the bolt 85, as a result of which the connection between the rails 75 and 76 and 10 and 11 is established.

FIG. 8 shows a plate-type storage place which contains a fixed base plate 90, which has been placed onto the carrier plate 61 of the device. The base plate 90 contains an annular groove 90a in which the disks of the balance wheel bodies 12 lie. The base plate contains, furthermore, a slot 90b running in a radial direction, through which always one balance wheel body can reach the guide rails 10 and 11, passing through the carrier plate 61.

A rotatable part 92 has been arranged above the base plate 90, which has been subdivided by intermediate walls 92a into sector-shaped compartments. This rotatable part 92 is driven by a step-by-step motor 93, in such a manner that at each drive phase one balance wheel body 12 is brought into the area of the slot 90b.

In FIGS. 9 and 10, the take off device, FIG. 1, with its rails 14 has been shown in more detail. These rails are held by a holder 95. A separate piece of rail 14' has been inserted in one of the rails 14, which separate piece is connected, for example, with a rotary magnet 97. With the aid of this rotary magnet 97, it will be possible to swing the piece of rail 14' from the position shown in FIG. 9 into the position shown in FIG. 10, in which it runs parallel to a further piece of rail 96. In this way it will be possible to eliminate individual balance wheel bodies, for example, such as those that cannot be equilibrated.

The method of operation of the device according to the invention will now be described in detail on the basis of FIG. 16. By operation of the switch 149, the transport engine 20 driving the control shaft 19, FIG. 1, is switched on by means of the relay 148. As a result thereof and as explained previously, a balance wheel body 12' is guided to the measuring device 13 or balancing scale, and the friction wheel 17, FIG. 1, is brought into frictional contact with the body of the balance wheel. The motor 15, driving the friction wheel 17, is switched on simultaneously with the transport motor 20. A control disk 134 has been arranged on the shaft 15a driven by the motor 15, which switches off the motor 15 again by a switch or a relay 136. The transport motor 20 too is switched off again by means of a switch which has not been shown and which is controlled by the motor itself.

After switching off of the motor 15 and after removal of the friction wheel 17 from the balance wheel body 12, the latter will run out freely, as a result of which the measuring device 13 is placed into vibrations, becoming even stronger, which are converted into electrical voltage variations by the condenser 100. These voltage variations are fed to a high frequency carrier circuit 101, high frequency oscillator and demodulator stage. The low frequency on the output side is fed to an amplifier 103 by means of a relay 102 or a flip-flop circuit, the output of said amplifier being indicated by a measuring instrument 104. On the measuring instrument 104 one will thus be able to read the value of the imbalance.

The output of the amplifier 103 is furthermore guided to a rectifier 105, whose output voltage is filtered by the stage 106. This smoothed direct current voltage is fed to an amplifier 108 by a phase producer 107, the output of said amplifier being used for the control of a servomotor 109 with the windings 110 and 111. A potentiometer 112 is driven by the shaft 113, driven by the motor 109, said potentiometer being connected with the phase producer 107. The elements 107 to 112 represent a servo-operated control for a rising and falling DC current, which is controlled by the voltage produced by the balance wheel 12'. The angle of rotation of the motor 109 is therefore proportional to the magnitude of the imbalance.

The shaft 113 carries at its end a disk 117 with a peg 117a, against which a lever 120 rests, which is connected with the shaft 119, and this shaft is driven in the same measure during the adjusting movement of the motor 109. A cam disk 121 has been arranged on the shaft 119, which cooperates with a lever 127 mounted swiveably on the axis 126. The position of the lever is determined by the position of the cam 121. This lever 127 acts as a stop for a collar arranged on the spindle 140 of the tool, so that by the adjustment of the lever 127, which corresponds to the magnitude of the imbalance, the operating depth of the tool 58 will be limited.

Furthermore, a disk 122 has been arranged on the shaft 119 which can be held firmly with the aid of a magnet 123. Therefore, the shaft 119 can be arrested in a certain position, while the shaft 113, after having reached a certain angular position, can again return to the zero position, whereby the spring 118, connecting the disk 17 with the shaft 17a, is cocked. After releasing or after denergizing the magnet 123, it will then be possible for the shaft 119 to return again into its rest position.

Another disk 114 has been arranged on the shaft 113, which carries a cam 114a adjustable in the peripheral direction. Beside the disk 114, a lever 116 has been mounted swiveably on an axis 115. This lever 116 carries a pointed pin 116b, which rests on the cam 114a. Furthermore, a lever 116 has an arm 116a which rests with its free end 116b on the periphery of the disk 114. In case of an adjusting movement of the motor 109, the disk 114 revolves in the direction of the arrow V, as a result of which the pointed pin 116b is lifted off the cam 114a. In the case of the return movement of the motor 109, on the other hand, the disk is moved in the direction of the arrow R, as a result of which the lever 116 too is moved in this direction. If the adjusting movement of the motor 109 has been so small that the cam 114a did not move away from under the pointed pin 116b, then in the case of a return adjustment of the motor, the pointed pin 116b will again touch the cam 114a, so that the lever 116 will again assume the position of FIG. 16. If, however, the adjusting movement of the motor 109 has been so great that the cam 114a has moved away from under the pointed pin 116 then the lever in the case of the return adjusting movement will not be stopped by the cam 114a, but will be moved further to the right, as a result of which the contact 116a, located on the lever 116, will touch the stationary contact 150. As a result thereof, the thyratron 131 is switched on, which prepares the thyratron 130 for a switching step. Without such a preparation, the thyratron cannot be fired or switched by the impulse arriving from the impulse delayer 129.

In the following, three methods of operation, corresponding to three different balance wheel bodies with varying imbalance values, FIG. 17, will be explained.

In the case of a balance wheel body with a very small imbalance, which is still located within a permissible area (Example 1 in FIG. 17), the method takes place in the manner as already described, that is, first of all, the motors 15 and 20 are placed in motion and are switched off again by automatically controlled switches, while the vibrations of the measuring device are converted into corresponding electric voltages which bring about the adjustment of the lever 127. Because of the small imbalance, the angle of rotation of the motor 109 is so small that the pointed pin 116b does not leave the area of the cam 114a. It is now explained that the area of tolerance is adjustable with the aid of this cam 114a. Naturally, it is also possible, in a reverse manner, to change the area of tolerance in an electric way by the adjustment of the zero point of the servomotor. Since in the present case the pointed pin does not leave the area of the cam 114a, the contact 116a, 150 will not be closed either in the case of untwisting of the motor, and thus the thyratron 131 is not fired. Thus a firing of the thyratron 130 is not possible either.

Besides, the delaying relay 137 has been excited by the relay 102, the delay time of the former being somewhat longer than the time required for the adjustment and resetting of the servomotor 109. Since a firing of the thyratron 130 does not take place, the transport motor 20 is switched on by this relay 137, as a result of which and by means of the control shaft 19, FIG. 1, the balance wheel is released by the measuring device, while a new balance wheel is placed into the measuring device 13.

Figure 17:
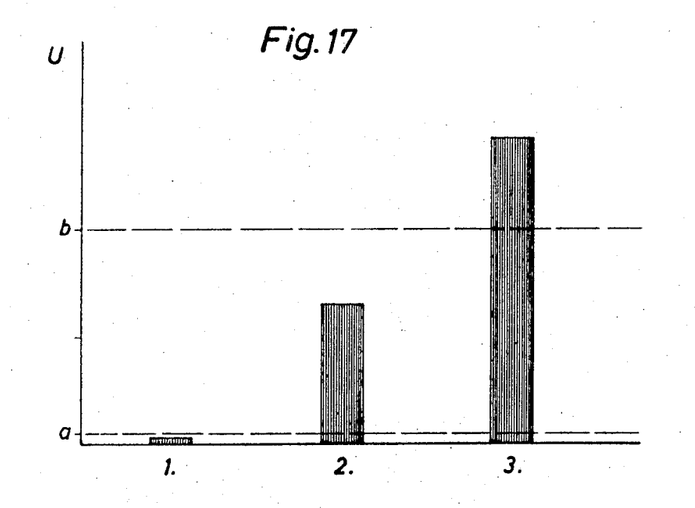
FIG. 17 is a graphic diagram showing three different balance bodies.

In the case of a balance wheel with an imbalance value corresponding to the second example in FIG. 17, the adjustment of the lever 127 is accomplished in the same way as in the first case. However, the adjusting motor has revolved at such an angle that the pointed pin 116b is no longer within the area of the cam 114a. In the case of resetting of the disk 114, the contact 116a, 150 will thus be closed, as a result of which the thyratron 131 is fired and the thyratron 130 is prepared. The latter will then be fired through the next impulse arriving from the impulse retarder 129, as a result of which the magnet 123 is energized, which stops, by the disk 122, the shaft 119 and thus also the lever 127, while the shaft 113 is able to return into the zero position whereby, as already mentioned, the spring 118 is cocked. The magnet 132, which operates the braking arrangement 59 for the body of the balance wheel 12, is energized simultaneously with the magnet 123. As a result thereof, the balance wheel will be stopped in such a position in front of the tool 58, that the imbalance can be eliminated by this tool. Through the excitation of the relay 138, the driving motor 139 is switched on and thus the tool is placed in motion, whose working depth is limited by the lever in connection with the collar 141.

Besides, the delay relay 137 has been deenergized by the thyratron 130 by the relay 102, so that a renewed switching on of the transport motor 20 cannot be accomplished.

A second shaft 142, which carries two control disks 143 and 144, is driven by the motor 139 which operates the tool 58. After the shaft 142 reaches a certain angle of rotation, the balance wheel-driving motor 15 is switched on for the purpose of a remeasurement of the balance wheel body treated, by the control disk 144 by relay 145. At the same time, the lever part 18b is deviated by the rotary magnet 31, shown in FIG. 1, and thus the friction wheel 17 is brought into frictional contact with the balance wheel body 12.

The contact 146a is opened for a brief time by the control disk 143 by the relay 146, so that the thyratron 130 is switched off. As a result thereof, the magnet 123 is deenergized and thus the shaft 119 is released, which moves back upon the action of the spring 118, until the lever 120 again touches the peg 117a. Beside that, the braking device 132, 59 is deenergized and the motor 139 is switched off.

If the remeasurement shows that the remaining imbalance lies below the limit a, FIG. 17, then the transport motor 20, as described in connection with the first example, will be switched on and the balance wheel will be released from the measuring device 13.

If the balance wheel body has a very large imbalance, corresponding to the third example in FIG. 17, then an equilibration in one operation process will not be possible. Then, following the first work process and as explained in connection with the second example in FIG. 17, a second work process will take place, and, if need be, even a third such work process until the imbalance has dropped below the limit a in FIG. 17.

Besides, the circuit contains four switches I to IV, which can be operated by hand, and with which one will be able to adjust different modes of operation. The following modes of operation are possible:

1. Switch I open: In this case the servo-control is switched off and one can make a simple measurement or a control of the imbalance.
2. Switch II open: In this switching position it will be possible to measure the imbalance for the the purpose of calibrating the device and the body that is to be equilibrated can be clamped down firmly, and thus the position of the center of the mass can be indicated.
3. Switch IV open: In the case of this position of the switch, the imbalance is measured, the adjusting device is operated, the balance wheel is slowed down and clamped down, and subsequently the balance wheel is worked in order to eliminate the imbalance, whereupon a remeasurement takes place after each working. This method of operation has been described in connection with the third example in FIG. 17.
4. Switch III open: In the case of this method of operation, the imbalance is measured, the adjusting device is operated, the balance wheel is slowed down and clamped firmly and subsequently the balance wheel body is worked, whereby a remeasurement will be made only in such a case whenever the imbalance surpasses a certain value.

In the case of the operating method 4 (Switch III open), no remeasurement takes place within the range a to b, FIG. 17. In the case of a value of the imbalance according to the second example in FIG. 17, the method takes its course just as in the operating method 3, as described. Switching on of the transport motor 20 takes place by the control disk 144, the relay 145 and the relays 147 and 148, since the switch III is open. The relay 147 will be acted upon by the relay 125, which in turn is switched in dependence on the angle or rotation of the shaft 119, and thus on the value of the imbalance of the balance wheel body 12. If the imbalance surpasses a certain value, namely the border line b in FIG. 17, then the relay 147 will be influenced by the relay 125, as a result of which, as already mentioned, switching on of the motor 15 will be accomplished; if the imbalance is below the border line b, then the relay 125 will not be operated and in that case the transport motor 20 will be switched on by the relay 145 and the relay 147, and thus the balance wheel will be released from the measuring device 13 without remeasurement.

In the case of the device described, a cam disk 114 is used for the setting of the range of tolerance. Naturally it is also possible to use other devices instead of the cam disk 114 for the adjustment of the range of tolerance, for example, an electronic arrangement which operates on the basis of a condenser discharge.

We claim:
1. Device for determination and elimination of the imbalance of a rotatory body with a slight gyrating mass, preferably a balance wheel comprising a holding device for the rotatory body, a measuring means for determining the value and the position of the imbalance, a tool for the elimination of the imbalance such as a drilling device with a braking device which arrests the rotatory body that is to be equilibrated in a suitable position before the tool for the elimination of the imbalance, transportation means to move the body that is to be equilibrated into the measuring means and moving it out again therefrom, and control means for the braking device influenced by the measuring means, the tool and the transportation means as well as the holding device, at the same time the control means containing a follower control for a rising and falling DC voltage consisting of an adjusting motor fed by an amplifier, a phase transmitter to control said amplifier and being influenced by a DC current signal discharged by the measuring means and is influenced by a second signal which is supplied by a potentiometer arranged on the shaft of the adjusting motor, a shaft having a cam mounted thereon for the adjustment of a stop member limiting the feed path of the tool and which is connected with a shaft of the adjusting motor by a return spring and is coupled rigidly with said shaft in only one direction, a holding means for the shaft on which the adjusting cam for the stop member is mounted, and switching means for switching on the holding means of the braking means for the body that is to be equalized, said switching means being operated in dependence on the rotational direction and on the magnitude of the rotational angle of said adjusting motor and a further motor driving said tool.

* * * * *